United States Patent [19]

Kindt

[11] 4,220,006
[45] Sep. 2, 1980

[54] POWER GENERATOR

[76] Inventor: Robert J. Kindt, 100 Eastgate Dr., Rochester, N.Y. 14617

[21] Appl. No.: 961,942

[22] Filed: Nov. 20, 1978

[51] Int. Cl.³ .............................................. F03G 7/06
[52] U.S. Cl. ..................................... 60/527; 60/325; 60/530; 92/98 R; 417/379
[58] Field of Search ................. 60/508, 509, 516, 527, 60/530, 325; 417/379, 394; 92/98 R

[56] References Cited

U.S. PATENT DOCUMENTS

| 989,044 | 4/1911 | Pool ...................................... 60/515 |
| 2,979,888 | 4/1961 | Moloney ............................... 60/530 |

FOREIGN PATENT DOCUMENTS 2701861  7/1978  Fed. Rep. of Germany ............. 60/527

Primary Examiner—Allen M. Ostrager
Attorney, Agent, or Firm—Lawrence P. Kessler

[57] ABSTRACT

A power generator utilizing the full volumetric expansion of water upon its change from the liquid phase to the solid phase (ice). The generator includes a chamber having heat transmitting, fluid impervious, flexible walls. The chamber is filled with water. A pressure-containing housing has an internal cavity in which the chamber is located in spaced relation to the housing. The space between the housing and the flexible walls of the chamber is filled with a fluid which is circulated through the cavity. A conduit connected to the housing provides flow communication between the cavity and means for utilizing moving fluid, such as a fluid driven motor. The phase of the water in the chamber is changed from liquid to solid so that the water expands in volume. Expansion of the water expands the flexible walls of the chamber to displace a proportional amount of fluid from the housing through the conduit, the moving displaced fluid serving as a power medium to drive the motor to do work.

10 Claims, 4 Drawing Figures

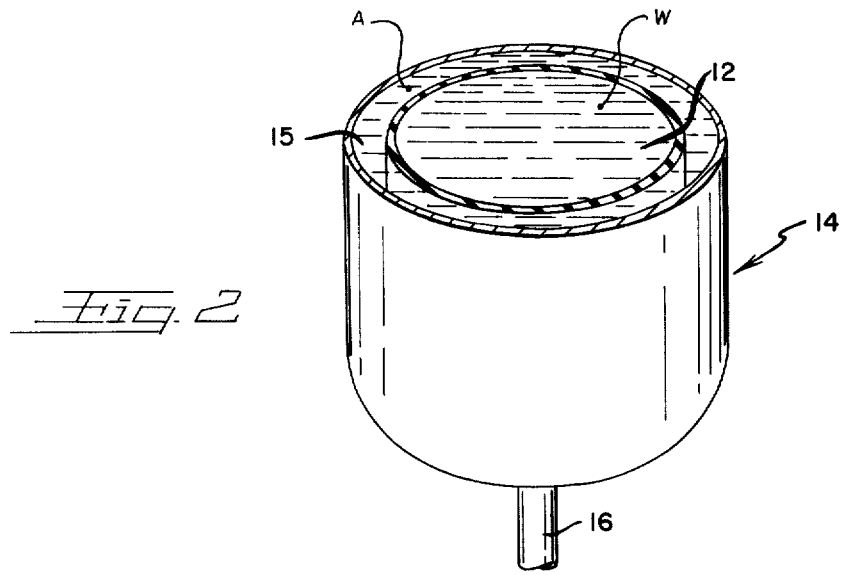
_Fig. 2_
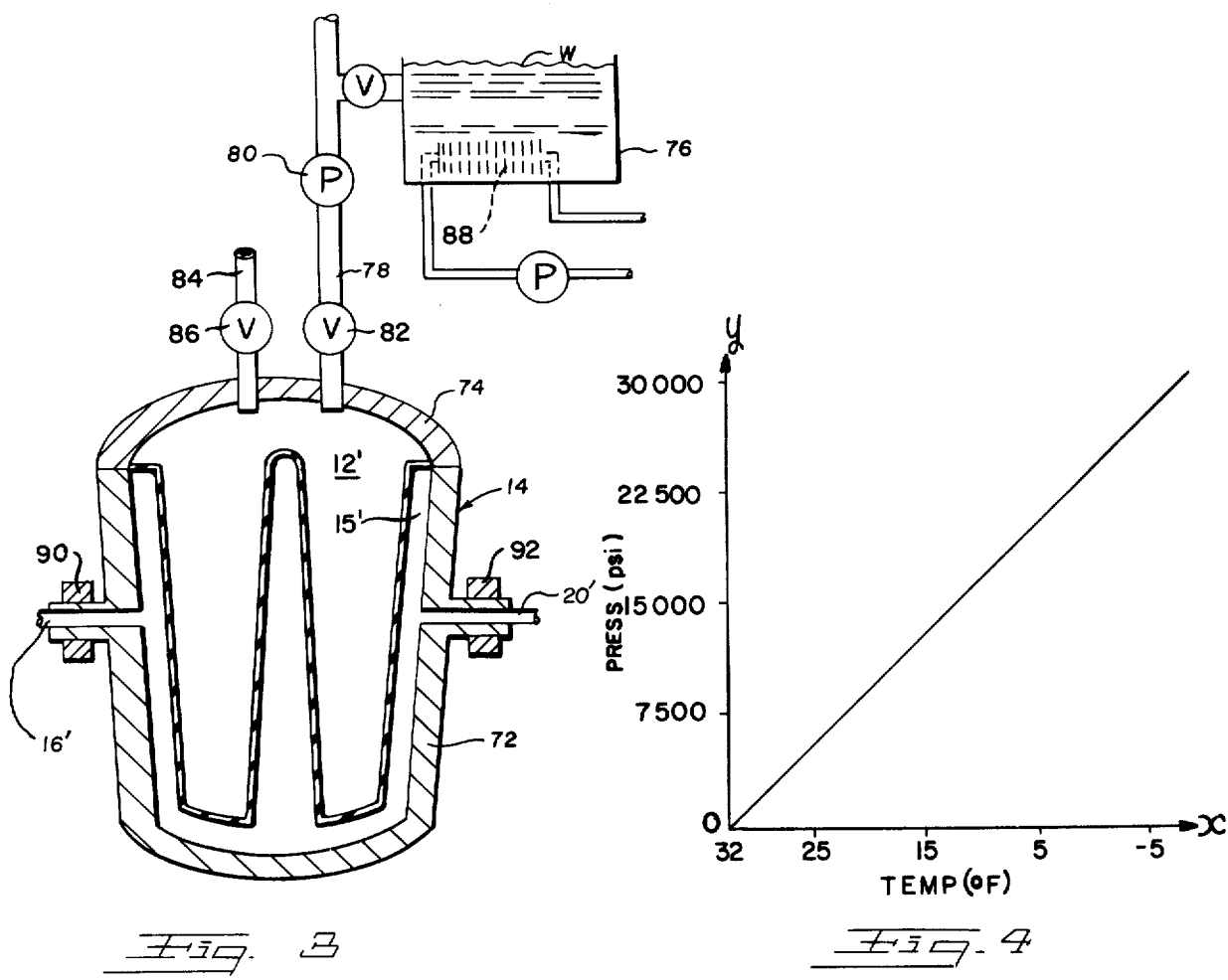
_Fig. 3_
_Fig. 4_

4,220,006

POWER GENERATOR

BACKGROUND OF THE INVENTION

1. Field of the Invention

This invention relates generally to power generating apparatus, and more particularly to a power generator utilizing the volumetric expansion of water upon its change of phase from liquid to solid for production of power.

2. Description of the Prior Art

It is a fundamental law of nature that when water changes phase from a liquid to a solid, there is a corresponding expansion in volume of about 10–15%, depending upon the pressure and temperature at which the phase change occurs. Over the years, many attempts have been made to develop apparatus for harnessing this volumetric expansion to do usefull work such as driving a motor. In general, such apparatus utilize water confined in a chamber and initially chilled to its freezing point. Further chilling of the confined water results in the removal of the heat of fusion, which causes the water to begin its change of phase to ice. The volumetric expansion of that portion of water changing phase serves to force the remaining liquid water from the chamber into a piston-cylinder in fluid communication with the chamber. The water moves the piston in the cylinder with the rod of the piston being used to do work.

A typical example of a power generator of the type utilizing the volumetric expansion of water upon change of phase is shown in U.S. Pat. No. 989,044, issued Apr. 11, 1911, in the name of Pool. In the apparatus shown in such patent, parallel chilling chambers and piston-cylinders are employed. The rods of the pistons in the respective chambers are actuated by the volumetric expansion of water as it changes phase to provide unidirectional rotation of a gear motor. However, the power generated by apparatus of this type is limited due to the fact that the full volumetric expansion of the water cannot be utilized. This is because the configuration of the chamber permits the expansion to occur in only one direction; further, if the water completely changes phase to solid ice, the movement of the piston will be inhibited, and the ice must be remelted to enable the piston to complete its return stroke.

SUMMARY OF THE INVENTION

The power generator of this invention utilizes the full volumetric expansion of water upon its change from the liquid phase to the solid phase (ice). The generator includes a chamber having heat transmitting, fluid impervious, flexible walls. The chamber is filled with water. A pressure-containing housing has an internal cavity in which the chamber is located in spaced relation to the housing. The space between the housing and the flexible walls of the chamber is filled with a fluid which is circulated through the cavity. A conduit connected to the housing provides flow communication between the cavity and means for utilizing moving fluid, such as a fluid driven motor. The phase of the water in the chamber is changed from liquid to solid so that the water expands in volume. Expansion of the water expands the flexilbe walls of the chamber to displace a proportional amount of fluid from the housing through the conduit, the moving displaced fluid serving as a power medium to drive the motor to do work.

The work output of the fluid-driven motor can be used to drive a liquid-cooled refrigerant compressor. The compressor's liquid coolant absorbs at least a portion of the heat of compression to be used, for example, for heating interior living space or water for household use. The refrigerant gas, which is heated upon compression, is passed through a heat exchanger cooling the gas to a liquid. The heat extracted in such heat exchanger can also be used for heating interior living spaces. Further, when the liquid refrigerant is expanded to return it to its gaseous phase, it is cooled to a temperature which enables it to be used with (or instead of) outside air to cool the liquid in the housing and, in turn, to change the phase of the water in the chamber from liquid to solid. With the emphasis on ecologically compatible power generation, advantage can be taken of the naturally occurring below-freezing temperatures available in northern climates, sometimes twenty-four hours-a-day, to accomplish the change of phase of the water in the chamber by which power is generated.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIG. 2 is a cross-sectional view in perspective of a portion of the power generator housing and flexible-walled chamber of FIG. 1;

FIG. 3 is a schematic view of an alternative embodiment of the power generator of this invention; and FIG. 4 is a graphical representation of the melting point of ice (in degrees Fahrenheit) plotted along the X axis vs. pressure (in psi) plotted along the Y axis.

DESCRIPTION OF THE PREFERRED EMBODIMENTS

Figure 1:
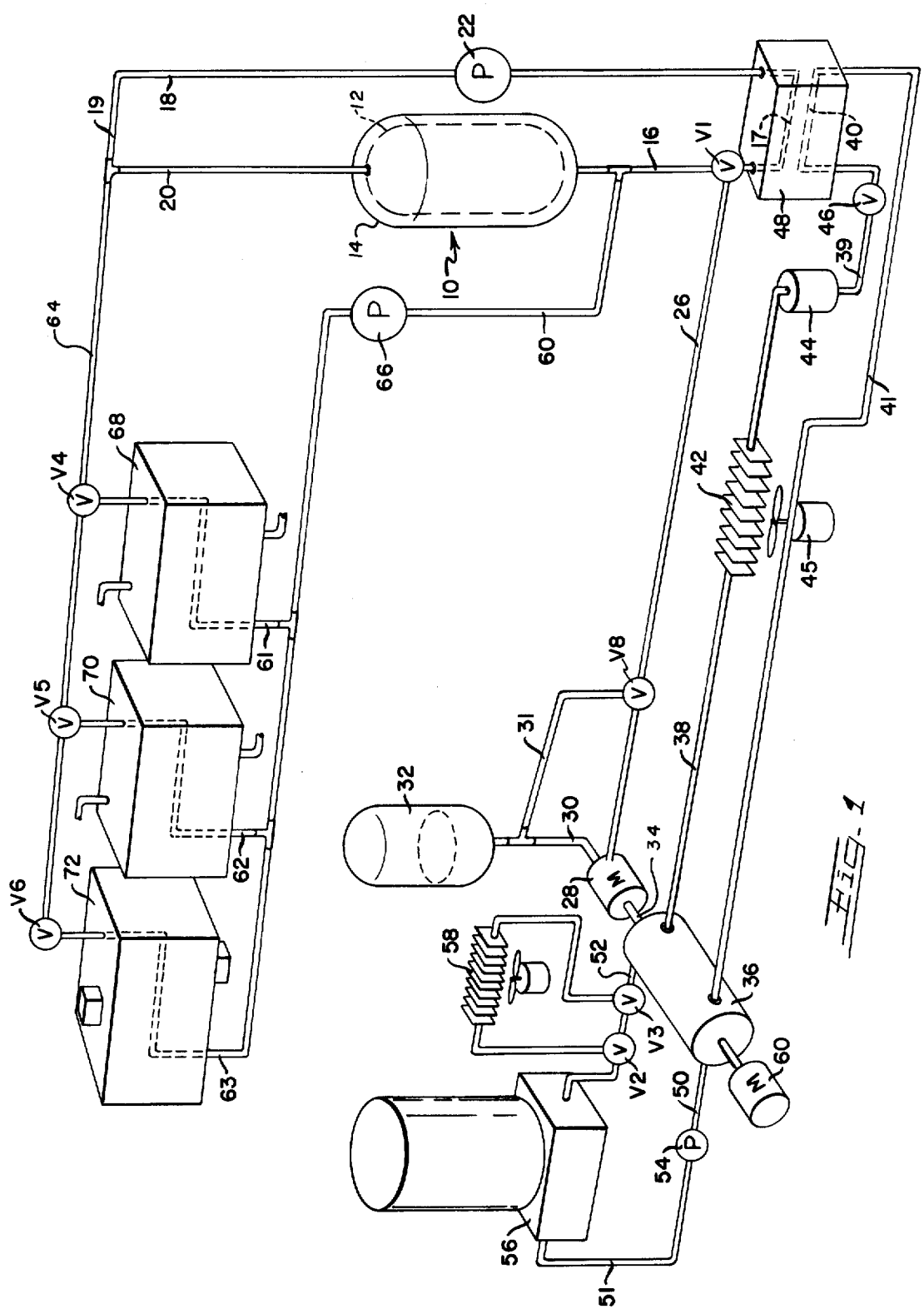
FIG. 1 is a schematic view of the power generator of this invention arranged to drive a fluid motor for a liquid cooled refrigerant compressor.

Referring now to the drawings, the power generator 10 of FIGS. 1 and 2 comprises a chamber 12 completely filled with water W. The chamber 12 is formed of a flexible material capable of conducting heat and impervious to fluids, such as ADIPRENE$^R$, a polyurethane elastomer. The chamber 12 is positioned within the interior cavity 15 of a pressure-containing housing 14 to define a space between the chamber and housing. The interior volume of the cavity 15 is selected to be of a size to enable the flexible-walled chamber 12 to fully expand in all directions as the volume of the water within the chamber expands upon change of phase from liquid to solid (ice). The space between the chamber 12 and the housing 14 is filled with an antifreeze fluid A, such as a mixture of ethylene glycol and water.

Conduits 16 through 20 (FIG. 1) are connected in flow communication with the housing of power generator 10, and provide a first flow path for the antifreeze fluid A. A pump 22 in the conduit 28 circulates the fluid in such flow path. A conduit 26, in flow communication with a fluid motor 28, is in flow communication with conduit 16 through a "T" valve $V_1$ located in conduit 16. When the valve $V_1$ is opened, antifreeze fluid A is free to flow in the conduit 26 to drive the fluid motor 28. The antifreeze fluid A is moved through conduit 26 by expansion of the chamber 12 to displace the antifreeze from the cavity 15 into the conduit 26. The expansion is effected by utilizing the antifreeze fluid A to freeze the water in the chamber 12. When the water changes phase from liquid to ice, it increases in volume thus expanding the flexible walls of the chamber 12.

A conduit 30, connected in flow communication between the motor 28 and a pressurized storage tank 32, provides a flow path for the antifreeze fluid A exhausted from the motor. Conduit 31 is connected in flow communication with conduit 30 and with conduit 26 through a one-way valve $V_8$. Valve $V_8$ can be opened to enable the antifreeze exhausted from the motor 28 to the tank 32 to be returned through the conduits 30, 31, and 26 to the cavity 15.

The fluid motor 28 has an output shaft 34 rotatably driven by the antifreeze fluid A in any well known manner. Shaft 34 drives a liquid cooled, refrigerant compressor 36. Conduits 38 through 41 are connected in flow communication with the compressor 36 and provide a flow path for the refrigerant. The refrigerant, which may be for example Freon, is delivered in its gaseous phase to the compressor by conduit 41. The compressor 36 compresses the refrigerant and, in the process, generates a quantity of heat, a portion of which is stored in the refrigerant being carried from the compressor by the conduit 38. Compressor 36 can also be driven by an auxiliary electric motor 60 to compress the refrigerant, for example, on start up. A heat exchanger 42 in the conduit 38 removes a portion of the stored heat from the compressed refrigerant. The removed heat can be used for space heating, such as heating the interior of a home. A fan 45 blows air over the heat exchanger, and the air is warmed; the warmed air is then directed into the space to be heated by any suitable ducting.

As the compressed refrigerant passes through the heat exchanger 42, it is cooled and changes phase from a gas to a liquid. The liquid is stored in a chamber 44 in flow communication with conduit 38 downstream of the heat exchanger. Conduit 39, in flow communication with the chamber 44, is connected to the input side of an expansion valve 46. The refrigerant is transported through the conduit 39 into the expansion valve 46 where it is expanded to change from its liquid phase to its gaseous phase, with an accompanying substantial lowering of the temperature of the refrigerant. Conduit 40, connected in flow communication with the exit side of the expansion valve 46, carries the lowered temperature refrigerant, in its gaseous phase, into a heat exchanger 48. In the heat exchanger 48, the refrigerant in conduit 40 passes in heat exchange relationship with antifreeze fluid A in conduit 17, and the temperature of the antifreeze fluid is lowered.

Conduits 50 through 52 are connected in flow communication with the compressor 36, and particularly the liquid coolant circuit for the compressor, to provide a flow path for the coolant. A pump 54, between the conduits 50 and 51, circulates the coolant about the flow path. The liquid coolant absorbes a substantial portion of the heat produced during compression of the refrigerant by the compressor 36. A portion of the absorbed heat in the circulating coolant is given up in a heat exchanger 56, located between conduits 51 and 52. The heat exchanger 56 can be used, for example, to transfer heat from the coolant to water for household use. The circulating coolant can be shunted from conduit 52 to a heat exchanger 58 by arranging valves $V_2$ and $V_3$ to divert the coolant from the conduit 52 through the heat exchanger 58. Any excess heat remaining in the coolant can be removed by the heat exchanger 58 and such heat can be used, for example, for warming of interior living space in the same manner as heat extracted from heat exchanger 42 described above.

A second flow path for the antifreeze fluid A is established by conduits 60 through 64. Conduits 60 and 64 are in flow communication with conduits 16 and 20 respectively. A pump 66 in the conduit 60 circulates the fluid in such flow path. Conduits 61, 62, and 63 are located in parallel between conduits 60 and 64, and pass through chambers 68, 70, and 72 respectively. Valves $V_4$, $V_5$, and $V_6$ regulate flow through respective conduits 61, 62, and 63. Chambers 68, 70, and 72 are heat exchangers for transferring heat to or from the antifreeze fluid A. For example, heat exchanger 68 may communicate with the outside (environmental) air, while heat exchangers 70 and 72 may communicate with water sources, such as household waste water.

In the alternative embodiment of FIG. 3, the housing 14' is constructed as a pressure-containing vessel 72 having a removable cover 74. The cover 74 is connected in fluid communication with a chill tank 76 by a conduit 78. The water in the chill tank 76 is cooled by exposure to outside air or by transfer of heat to a heat exchanger 88 located within the tank. A pump 80 directs the chilled water from the tank 76 into the flexible-walled chamber 12', within the vessel 72, through a one-way valve 82 in the cover 74. An air vent 84 with a one-way valve 86 in the cover 74 allows air within the chamber 12' to escape when the chamber is filled with water. The heat transmitting flexible walls of chamber 12' are spaced from the internal walls of the vessel 72 forming a cavity 15' which is filled with antifreeze. As described with reference to the embodiment of FIGS. 1 and 2, the antifreeze in the space between the chamber 12' and the vessel 72 causes the water in the chamber to change phase from liquid to solid (ice). Upon change of phase, the water expands in volume thus expanding the flexible walls of the chamber to displace an equivalent volume of antifreeze. The displaced antifreeze leaves the vessel 72 through conduit 16' where it is utilized to do work, such as driving a fluid motor. After the phase change has gone to completion, the cover 74 may be removed and the ice emptied from the chamber 12', as by rotating the vessel 72 about bearings 90, 92. The chamber is then available to receive a new supply of water so that the work-developing phase change cycle can be repeated.

While the power generator 10 has been described as having one chamber 12 within a pressure-containing housing 14, it is of course understood that there may be a plurality of power generators (housings and respective flexible-walled chambers) used together. When more than one power generator is used, the cycle of the individual generators is timed by appropriate valves to cause the generators to act in series to continuously supply power to the motor 28. That is, the water in one generator may be changing phase to ice and expanding, while water in the other generators is being changed back from ice to liquid.

The magnitude of the power which can be generated by the above described apparatus, may be illustrated by the following example, particularly for the embodiment of FIGS. 1 and 2. For this example, it is assumed that the outside air temperature is 12° F. Initially, the space between the flexible-walled chamber 12 and the housing 14, conduits 16 through 20, pump 22, conduits 26 and 30, motor 28, conduits 60 through 64, and pump 66 are filled with antifreeze fluid A. At the same time, pressure tank 32 is also partially filled with the antifreeze fluid A, the remainder of the tank being filled with an inert gas under pressure to establish an initial pressure in the antifreeze fluid, as for example 2000 psi. Valve $V_6$ is opened so that the antifreeze fluid A being circulated by pumps 22 and 66 passes through heat exchanger 68 (communicating with the outside air). As such, the antifreeze fluid is chilled to about 12° F. and the cooled fluid is circulated in the space surrounding the flexible-walled chamber 12. The antifreeze fluid removes heat from the water within the chamber. Assuming the volume of water within the chamber 12 is one cubic foot, it is required that 8985 BTU's be extracted to remove the heat of fusion from the water. That is, since it takes 144 BTU's/pound of water at 32° F. to remove the heat of fusion from the water, and there are 62.4 pounds of water/cubic foot; therefore:

$$144 \text{ BTU's/pound} \times 62.4 \text{ pounds} = 8985 \text{ BTU's}.$$

Alternatively, the antifreeze fluid A can be cooled as it is circulated through heat exchanger 48 by the refrigerant in conduit 40 (at, for example, −30° F.). The fluid is then circulated about chamber 12 to remove the required 8985 BTU's.

As noted, the antifreeze fluid A is maintained at the initial minimum pressure of 2000 psi, by the inert gas in the pressure tank 32. The water in the chamber 12, with the heat of fusion removed, is prevented from changing phase to ice (with its resulting expansion) and remains in its liquid phase. The valve $V_1$ is then closed to isolate the circulating antifreeze fluid from the conduit 26 and contain the fluid within its closed path. Thus as the temperature of the water is further cooled by the antifreeze fluid A, the water wants to change phase from liquid to solid with the attendent volumetric expansion. However, the pressure of expansion is counteracted by pressure build-up in the contained antifreeze fluid. The pressure is permitted to build up to 30,000 psi. As can be seen in the graph of FIG. 4, the melting point of ice (freezing point of water) is related to pressure such that at 30,000 psi, the freezing point of the water has been lowered to −8° F. With the water lowered the additional 40° (i.e., 32° F. to −8° F.), an additional 2496 BTU's is required to be extracted from the water. That is, it takes 1 BTU to lower 1 pound of water 1° F.; therefore, to lower the one cubic foot of water 40°:

$$40 \times 62.4 = 2496 \text{ BTU's}.$$

When the pressure of the antifreeze fluid A has built up to 30,000 psi, valve $V_1$ is reopened to provide flow communication between conduit 26 and the cavity 15 of housing 14. With the valve $V_1$ open, the antifreeze fluid A can be forced from the cavity 15 as the water in chamber 12 is permitted to expand changing phase to ice. Because the walls of the chamber are flexible, the chamber expands uniformly and the phase change can go to completion. This represents about a 15% volume change at the particular temperature and pressure of this example. The expansion of the chamber 12 urges the antifreeze (at 30,000 psi) from the cavity 15 through the conduit 26 to drive the fluid motor 28.

The work available to the motor 28 enables the motor to drive the liquid cooled refrigerant compressor 36. As described above, the refrigerant compressed by the compressor is circulated in a path which provides for interior space heating through heat exchanger 42 and cooling of the antifreeze fluid A in heat exchanger 48. Further, the liquid coolant is circulated in a path which provides for heating of household water through heat exchanger 56, and for interior space heating through heat exchanger 58.

The amount of work available in the pressurized antifreeze fluid is the amount of energy imparted to the fluid by the expansion of the water in chamber 12. That is, the volume of the antifreeze fluid displaced by the expanding water, times the pressure of that displaced medium, equals work available; therefore:

$$0.15 \times 144 \text{ sq.in./sq.ft.} \times 30{,}000 \text{ psi} = 648{,}000 \text{ ft.lbs.}$$

Since the pressure in the antifreeze fluid after driving the motor 28 is 2000 psi, the net work available to drive the motor 28 is:

$$0.15 \times 144 \text{ sq.in/sq.ft.} \times 28{,}000 \text{ psi} = 604{,}800 \text{ ft.lbs.}$$

As can be readily appreciated, such amount of work available from the expansion of the water upon change of phase to ice is sufficient to drive the motor 28 to accomplish desired refrigerant compression.

With the pressure in the antifreeze fluid A reduced to 2000 psi, the antifreeze fluid is circulated in conduits 16 through 20 by pump 22 and in conduits 60 through 64 by pump 66. Valves $V_4$, $V_5$, and $V_6$ regulate the flow of antifreeze through heat exchangers 68, 70, and 72 respectively. As noted above, heat exchanger 68 communicates with the outside air (at 12° F. in this example) and can impart heat to the antifreeze fluid to raise its temperature back to approximately 12° F. Heat exchangers 70 and 72 are in communication with water sources, such as household waste water. The water in the heat exchanger 70, for example, may be under pressure so as not to freeze when cooled below 32° F. Thus when the antifreeze fluid is passed through heat exchangers 70, 72, it is further warmed to 32° F. Preferably, the valves $V_4$, $V_5$, and $V_6$ are cycled open and closed so that the antifreeze fluid is first warmed to 12° F. in exchanger 68, then to slightly less than 32° F. in exchanger 70, and finally to slightly greater than 32° F. in exchanger 72. It can be appreciated that the water in heat exchangers 70 and 72, which is cooled upon warming the antifreeze fluid A, can be used in air conditioning apparatus to cool living, working, or commercial areas.

The warmed antifreeze fluid A circulating through the housing 14 warms the ice within the chamber 12 from −8° F. to 32° F. This requires the addition of 2496 BTU's (the reverse of cooling the water as calculated above). If the pressure has been reduced to 15 psi, a heat of fusion equal to 8965 BTU's must be additionally imparted to the 1.15 cu. ft. of ice to cause it to change phase to 1 cu. ft. of water at 32° F. (the reverse of the freezing of the water as calculated above). If the pressure is maintained at 2000 psi, the ice will change into water at about 29° F. (see FIG. 4) and not require the 8965 BTU's to be imparted to the water. The 0.15 cu. ft. of antifreeze fluid displaced into tank 32 upon expansion of the water to ice would be returned to housing 14 through valve $V_8$, conduit 26, valve $V_1$, and conduit 16. This will change the 1.15 cu. ft. of ice back to 1 cu. ft. of water. To accomplish the volume reduction would require 43,200 foot pounds of work. That is:

$$2000 \text{ psi} \times 0.15 \times 144 \text{ cu. in./cu. ft.} = 43{,}200 \text{ ft. lbs.}$$

This results in only a slight negative impact on the available work produced by the power generator 10. With the water in the flexible-walled chamber 12 thus returned to its liquid phase, the cycle is ready to be repeated in the described manner.

While the invention has been described in detail with respect to preferred embodiments thereof, it will be understood that variations and modifications can be made within the spirit and scope of the invention as set forth in the following claims.

I claim:

1. Apparatus utilizing the volumetric expansion of water upon its change of phase for generating power, said apparatus comprising:
    a chamber having heat transmitting, fluid impervious, flexible walls, said chamber being filled with water;
    a housing having an internal cavity in which said chamber is located, said housing having pressure-containing walls spaced from said flexible walls of said chamber;
    a fluid filling such space between said pressure-containing walls and said flexible walls;
    means for circulating said fluid through said internal cavity in such space;
    a conduit connected to said housing in fluid communication with said interior cavity;
    means for changing the phase of the water in said chamber between its liquid phase and its solid phase, whereby when said water is changed to its solid phase, the volume of said water expands thereby expanding said flexible walls of said chamber to displace a proportional amount of fluid from said housing into said conduit; and
    means associated with said conduit for utilizing said displace moving fluid as a power medium to do work.

2. The invention of claim 1 in which said fluid has a freezing point substantially below that of water; and wherein said means for changing the phase of water includes a heat exchange means through which said fluid is directed by said circulating means, said heat exchange means comprising a cooling member for cooling said fluid below the freezing point of the water, and a heating member for heating said fluid above the freezing point of the water, whereby when said fluid is cooled in said heat exchange means and circulated through said cavity, it cools the water to change the phase of the water to ice, and when said fluid is heated in said heat exchange means and circulated through said cavity, it heats the water to change the phase of the water to liquid.

3. The invention of claim 2 wherein said cooling member of said heat exchange means communicates with air at its naturally occurring environmental temperature.

4. The invention of claim 2 wherein said housing includes:
    a vessel having a removable cover, and means in said cover for filling said chamber with water in its liquid phase.

5. The invention of claim 2 wherein said means for utilizing said displaced fluid includes a fluid motor driven by said displaced fluid.

6. The invention of claim 5 wherein said fluid motor drives a liquid cooled refrigerant compressor, the heat developed upon compression of the refrigerant by said compressor being transferred to the liquid coolant for said compressor, and means for using such heat to warm an interior living space.

7. The invention of claim 6 including means for recirculating the compressed refrigerant to said cooling member of said heat exchange means.

8. Power generating apparatus, utilizing the volumetric expansion of water upon change of phase, comprising:
    at least one housing having pressure-containing walls, said walls defining an internal cavity;
    a water filled substantially cylindrical chamber having heat transmitting, fluid impervious, flexible walls capable of expanding outwardly in all directions, said chamber being supported within said housing in spaced relation from the walls thereof, a circulating fluid disposed within the space between said flexible walls of said chamber and said pressure-containing walls of said housing;
    heat exchange means for selectively heating and cooling said circulating fluid to a degree for changing the phase of the water in said chamber between its liquid phase and its solid phase, the water expanding in volume when changed to its solid phase displacing an equal volume of said fluid;
    means, connected to said internal cavity of said at least one housing, for receiving said displaced fluid and using said displaced fluid as a power medium to do work.

9. The invention of claim 8 wherein said heat exchange means communicates with air at its naturally occurring environmental temperature to heat and cool said circulating fluid.

10. The invention of claim 8 wherein said means for receiving and using said displaced fluid includes: a fluid motor, a liquid cooled refrigerant compressor driven by said fluid motor, a first flow path for said refrigerant, a second flow path for the compressor coolant, and first and second heat exchangers located in said first and second flow paths respectively, wherby when said compressor is driven by said fluid motor, the refrigerant and the liquid coolant can be used for heating and cooling interior living spaces.

* * * * *